(12) United States Patent
Shin

(10) Patent No.: US 10,415,902 B2
(45) Date of Patent: Sep. 17, 2019

(54) COOLING TOWER WATER DISTRIBUTION SYSTEM

(71) Applicant: Baltimore Aircoil Company, Inc., Jessup, MD (US)

(72) Inventor: Yoon Shin, Ellicott City, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 121 days.

(21) Appl. No.: 15/373,647

(22) Filed: Dec. 9, 2016

(65) Prior Publication Data

US 2018/0164054 A1 Jun. 14, 2018

(51) Int. Cl.
| | |
|---|---|
| *F28F 25/04* | (2006.01) |
| *F28C 1/04* | (2006.01) |
| *F28F 25/02* | (2006.01) |
| *F28B 1/02* | (2006.01) |
| *F28B 3/04* | (2006.01) |
| *F28B 9/04* | (2006.01) |

(52) U.S. Cl.
CPC .............. *F28F 25/04* (2013.01); *F28B 1/02* (2013.01); *F28B 3/04* (2013.01); *F28B 9/04* (2013.01); *F28C 1/04* (2013.01); *F28F 25/02* (2013.01)

(58) Field of Classification Search
CPC ... F28F 25/04; F28F 25/02; F28B 9/04; F28B 3/04; F28B 1/02; F28C 1/04
See application file for complete search history.

(56) References Cited

U.S. PATENT DOCUMENTS

| | | | | |
|---|---|---|---|---|
| 4,592,878 | A * | 6/1986 | Scrivnor ................. | F16K 5/10 137/625.32 |
| 5,180,528 | A * | 1/1993 | Kaplan ................... | F28F 25/04 261/111 |
| 2013/0276476 | A1* | 10/2013 | Wong ...................... | F28F 25/04 62/513 |
| 2014/0216690 | A1* | 8/2014 | Headley ................. | F28F 25/04 165/104.19 |
| 2015/0035176 | A1* | 2/2015 | Wolf ....................... | F28F 25/04 261/19 |
| 2015/0330710 | A1* | 11/2015 | Curtis ...................... | F28C 1/02 261/29 |
| 2017/0030663 | A1* | 2/2017 | Petersen ................ | B01D 3/008 |

(Continued)

FOREIGN PATENT DOCUMENTS

| | | |
|---|---|---|
| CN | 2573981 Y | 9/2003 |
| CN | 202304475 U | 7/2012 |
| CN | 202793060 U | 3/2013 |

(Continued)

OTHER PUBLICATIONS

EPO translation of Eijiro et al. JP 2010-230261 published Oct. 14, 2010 (Year: 2010).*

(Continued)

*Primary Examiner* — Stephen Hobson
(74) *Attorney, Agent, or Firm* — Fitch, Even, Tabin & Flannery LLP (57) ABSTRACT

A cooling tower is provided having a heat exchange section. A water collection basin located above the heat exchange section. The water collection basin has a plurality of openings that allow water to be distributed downwardly onto the heat exchange section. The water collection basin openings each have a diameter of from 0.2 inch to 0.6 inch.

6 Claims, 5 Drawing Sheets

(56) References Cited

U.S. PATENT DOCUMENTS

2017/0160015 A1* 6/2017 Aaron .................... F28C 1/14

FOREIGN PATENT DOCUMENTS

| | | | |
|---|---|---|---|
| CN | 105026866 A | | 11/2015 |
| JP | S49037854 U | | 4/1974 |
| JP | S53087956 U | | 7/1978 |
| JP | H07218182 A | | 8/1995 |
| JP | 3680460 B2 | | 6/1998 |
| JP | H11148784 | * | 6/1999 |
| JP | 3040772 | * | 5/2000 |
| JP | 2005207621 A | | 8/2005 |
| JP | 2010-230261 | * | 10/2010 |
| TW | M491819 U | | 12/2014 |

OTHER PUBLICATIONS

EPO translation of Kesaaki et al. JPH11148784 published Jun. 2, 1999 (Year: 1999).*
EPO translation of Manabu et al. JP3040772 published May 15, 2000 (Year: 2000).*
Japanese Office Action from related Japanese Patent Application No. 2017-235807 (English translation included); dated Oct. 23, 2018; 15 pages.
Taiwan Office Action from related Taiwanese Patent Application No. 106142673 (English translation) dated Nov. 12, 2018; 10 pages.
Photographs of prior art hot water basins publicly available before Dec. 9, 2016; 3 pages.
Chinese Office Action with English translation from Chinese Patent Application No. 201711231738.9, dated Jun. 4, 2019; 19 pages.

* cited by examiner

COOLING TOWER WATER DISTRIBUTION SYSTEM

BACKGROUND OF THE INVENTION

The present invention relates generally to an improved spray water distribution system that is used within evaporative heat exchange apparatus such as cooling towers, closed circuit fluid coolers, fluid heaters, condensers, evaporators, thermal storage systems, air coolers or air heaters.

Some evaporative heat exchange apparatus use gravity fed, unpressurized spray water distribution systems to wet the surfaces of the direct or indirect heat exchangers. The water is sprayed from above the direct or indirect heat exchanger and generally flows downward to wet various surfaces of heat exchanger. Air is drawn or forced over the wetted surfaces of the heat exchanger causing both latent and sensible heat transfer to take place between the air and the thin film of water on the wetted surfaces.

To maximize evaporative heat transfer efficiency, all the surfaces of the direct or indirect heat exchanger should be evenly and uniformly wet. Heat exchangers that are partially or insufficiently wetted cause a loss of heat transfer and make it more likely that there will be fouling on the heat exchanger surfaces.

One design of a spray water distribution system design is a pressurized pipe spray system with or without spray nozzles. Another design is an open top, gravity drain water collection basin with plurality of spray nozzles or spray holes through where the top water basin delivers water downward by the gravity from the head of water height within the basin. This invention deals with the design of gravity drain water collection basin spray system without using any nozzles.

It is an object of the invention to allow for even and uniform wetting of the direct or indirect heat exchanger with evaporative fluid, usually water, coming from the gravity drain water collection basin spray system. It is another object of the invention to reduce the number of holes in the gravity drain basin water spray system which allows for larger diameter holes creating less chance for the holes to clog or allow for less frequent servicing of the gravity drain water collection basin spray system.

SUMMARY OF THE INVENTION

The present invention provides an improved gravity drain water collection basin spray system that is used in direct or indirect heat exchange apparatus such as a cooling tower, closed circuit fluid cooler, fluid heater, condenser, evaporator, thermal storage system, air cooler or air heater.

A typical evaporative cooling tower heat exchange apparatus has a direct heat exchanger, a fan system, an upper gravity drain water collection basin spray system, and lower sump to collect the evaporative liquid. The type of heat exchanger can be either an indirect heat exchanger, a direct heat exchanger or a combination of the two.

The indirect heat exchanger may be a coil or a plate style heat exchanger with process fluid flowing inside. The direct heat exchanger can be a fill pack which is typically made of plurality of individual thin plastic PVC fill sheets spaced apart using spacers. Fill sheets can be either hung underneath the upper gravity drain basin water spray system using a hanger system or cut into smaller pieces and bundled into plurality of small fill blocks which are then stacked on top of each other underneath the gravity drain water collection basin spray system, each fill sheet is generally rectangular in shape and has a face and an obverse face side and also employs a surface pattern that protrudes above and below the nominal plane of the sheet. Using spacers, fill sheets are generally separated by a nominal distance which is typically greater than the total height of surface pattern and generally a plane of air gap forms between two fill sheets. Spray water flows down from the top onto both faces of each fill sheet and adheres to the surface contour of each fill sheet. Because of the presence of air gap between sheets, spray water usually does not transfer from one sheet to its adjacent fill sheet.

A stream of air is either forced through or pulled through the fill air gaps by a fan system so that heat transfer occurs between the spray water and air stream. Above the fill pack is gravity drain water collection basin and typically there may be a pre-distribution box or system to allow for even flow into the gravity drain water collection basin. Water to be heated or cooled enters the upper gravity drain water collection basin through its pre-distribution box which turns a high velocity fast flowing water stream into a low velocity slow flowing well distributed water stream that flows over the gravity drain water collection basin floor. Typically there is enough water flow to back up water a few inches into the gravity drain basin. The gravity drain water collection basin floor has a plurality of spray holes. The combined low velocity and slowly flowing water coming from the pre-distribution box allows an even and uniform amount of water travel into and through every spray hole.

In a preferred embodiment, the spray holes are strategically located such that an equal number of holes are assigned to each face and obverse face of each fill sheet or each plate style heat exchanger. The holes assigned to each fill face are generally equally spaced apart to distribute spray water evenly on to each fill face. Because there could be large particles, such as rust chips and calcium carbonate chips, in the water stream, the diameter of number of spray holes are reduced to still allow superior water coverage onto each fill sheet while allowing for the spray hole diameter to be enlarged to let the particles flow through the spray holes.

Water sprayed from the upper gravity drain water collection basin generally flows down through each face of the fill and eventually into the lower sump which has a water outlet where cooled or heated water can be drained and later pumped back into the upper gravity drain water collection basin.

It is an object of the invention to allow for even and uniform wetting of the direct or indirect heat exchanger coming from the gravity drain water collection basin spray system. It is another object of the invention to reduce the number of holes in the gravity drain water collection basin spray system which allows for larger diameter holes creating less chance for the holes to clog or allow for less frequent servicing of the gravity drain basin water spray system.

DESCRIPTION OF THE PREFERRED EMBODIMENT

Figure 1:
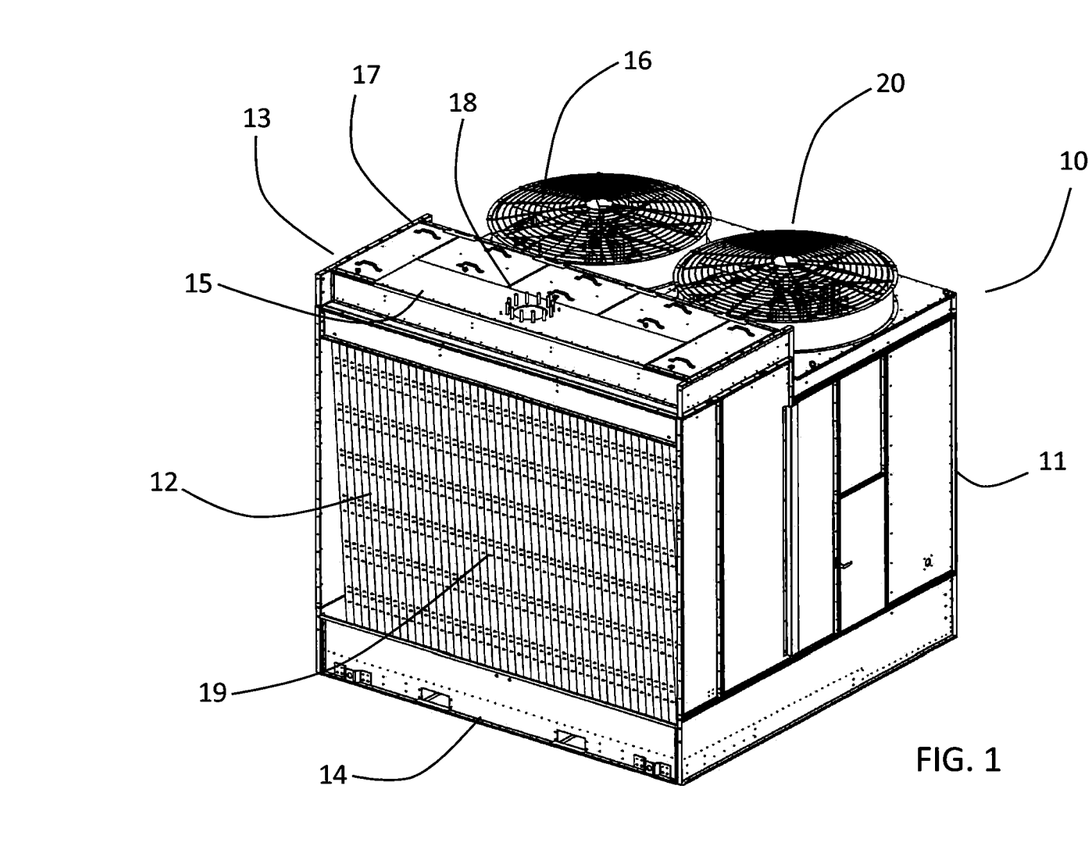
FIG. 1 is a perspective view of a direct heat exchange apparatus in accordance with the present invention.

Referring now to FIG. 1 of the drawings, an embodiment of the present invention is shown in a cooling tower direct heat exchange apparatus 10. Direct heat exchange apparatus 10 is comprised of casing 11, direct heat exchange fill pack 12, upper gravity drain water basin 13, lower water sump 14, water pre-distribution box 15, fan assembly 16, upper gravity drain basin covers 17, pre-distribution box pipe inlet 18, air inlet 19 and air outlet 20. It should be noted that the direct heat exchange fill pack may also be an indirect heat exchanger and is not a limitation of the invention. Cooling tower direct fill heat exchange apparatus 10 is generally enclosed in casing 11, which can be made of thin sheet of metal or fiber reinforced plastic. Casing 11 provides a housing for fill pack 12, upper gravity drain basin 13, fan assembly 16, and lower basin 14. Upper gravity drain basin 13 is located generally directly above fill pack 12 and fill pack 12 is located above lower sump 14. Upper gravity drain basin 13 is generally rectangular in shape having a width, length, and height. The width and length of upper gravity drain basin 13 is generally the same size as width and length of fill pack 12 and the height is usually four to 12 inches. Upper gravity drain water collection basin 13 may be covered with a plurality of upper gravity drain water collection basin covers 17 to prevent debris from entering. Inside upper gravity drain water collection basin 13 is pre-distribution box 15, which sits generally in the middle of upper basin 13, but pre-distribution box 15 could be placed anywhere of upper basin 13. Water enters upper gravity drain water collection basin 13 through pre-distribution box 15 which helps to spread water more evenly throughout upper gravity drain water collection basin 13. Fan assembly 16 draws in air through air inlet 19 and generally in crossflow through fill pack 12 and ejects air out of direct heat exchange apparatus 10 through air outlet 20. The direction of airflow may be generally upwards, generally downwards, generally across or generally concurrent with the water flow through the direct heat exchanger. Cooling tower direct heat exchange apparatus 10 may have one or more water inlets 18, one or more fill packs 12, one or more fan assembly 16 and one or more air outlets 20.

Figure 1A:
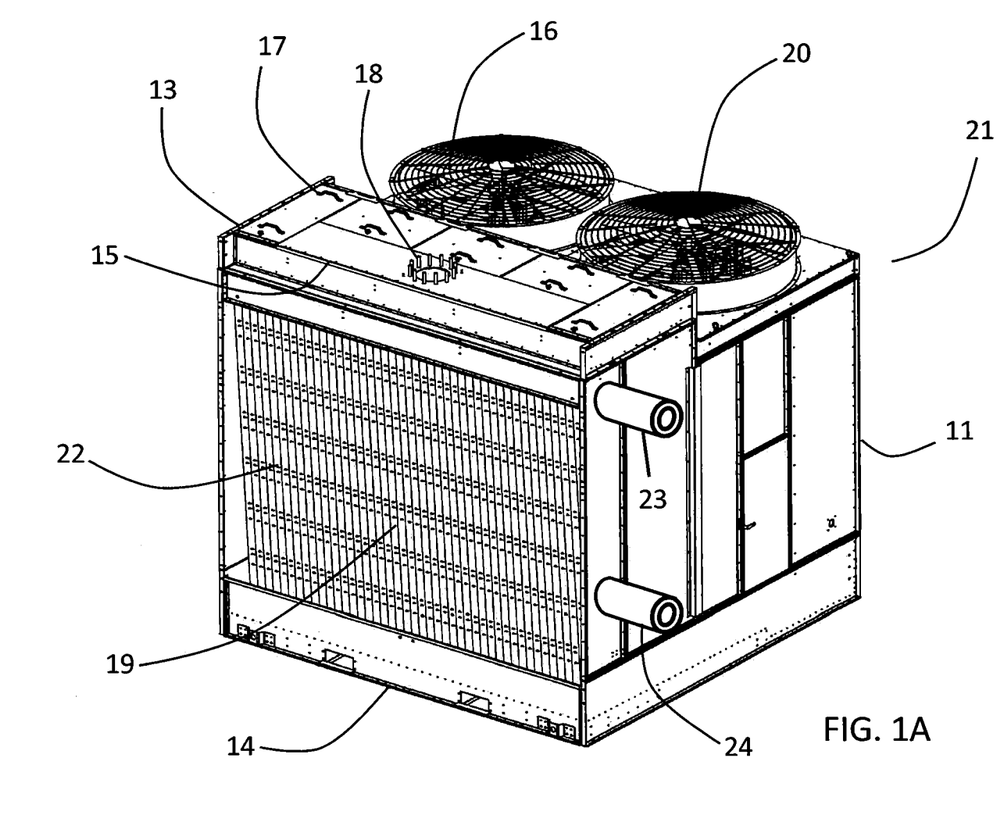
FIG. 1A is a perspective view of an indirect heat exchange apparatus in accordance with the present invention.

Referring now to FIG. 1A of the drawings, an embodiment of the present invention is shown in an indirect heat exchange apparatus 21. Indirect heat exchange apparatus 22 is comprised of casing 11, indirect heat exchange section 22, upper gravity drain water collection basin 13, lower water sump 14, water pre-distribution box 15, fan assembly 16, upper gravity drain water collection basin covers 17, pre-distribution box pipe inlet 18, air inlet 19 and air outlet 20. It should be noted that the indirect heat exchange section may be of any type including tubes, plates, finned and is not a limitation of the invention. It could also be a combination direct/indirect heat exchange section. Indirect heat exchange apparatus 21 is generally enclosed in casing 11, which can be made of thin sheet of metal or fiber reinforced plastic. Casing 11 provides a housing for indirect heat exchange section 22, upper gravity drain basin 13, fan assembly 16, and lower basin 14. Upper gravity drain water collection basin 13 is located generally directly above indirect heat exchange section 22 which is located above lower sump 14. Upper gravity drain water collection basin 13 is generally rectangular in shape having a width, length, and height. The width and length of upper gravity drain water collection basin 13 is generally the same size as width and length of indirect heat exchange section 22 and the height is usually four to 12 inches. Upper gravity drain water collection basin 13 may be covered with a plurality of upper gravity drain water collection basin covers 17 to prevent debris from entering. Inside upper gravity drain water collection basin 13 is pre-distribution box 15, which sits generally in the middle of upper water collection basin 13, but pre-distribution box 15 could be placed anywhere of upper water collection basin 13. Water enters upper gravity drain water collection basin 13 through pre-distribution box 15 and spreads throughout upper gravity drain water collection basin 13. Fan assembly 16 draws in air through air inlet 19 and generally in crossflow through indirect heat exchange section 22 and ejects air out of indirect heat exchange apparatus 21 through air outlet 20. The direction of airflow may be generally upwards, generally downwards, generally across or generally concurrent with the water flow through the indirect heat exchanger. Indirect heat exchange section 22 has internal process fluid inlet pipe 23 and outlet pipe 24. The connections can be reversed if desired. The interior process fluid is cooled indirectly from the evaporative water that flows by gravity generally downward across from the upper gravity drain water collection basin 13. Indirect heat exchange apparatus 21 may have one or more water inlets 18, one or more indirect heat exchange sections 22, one or more fan assembly 16 and one or more air outlets 20.

Figure 2:
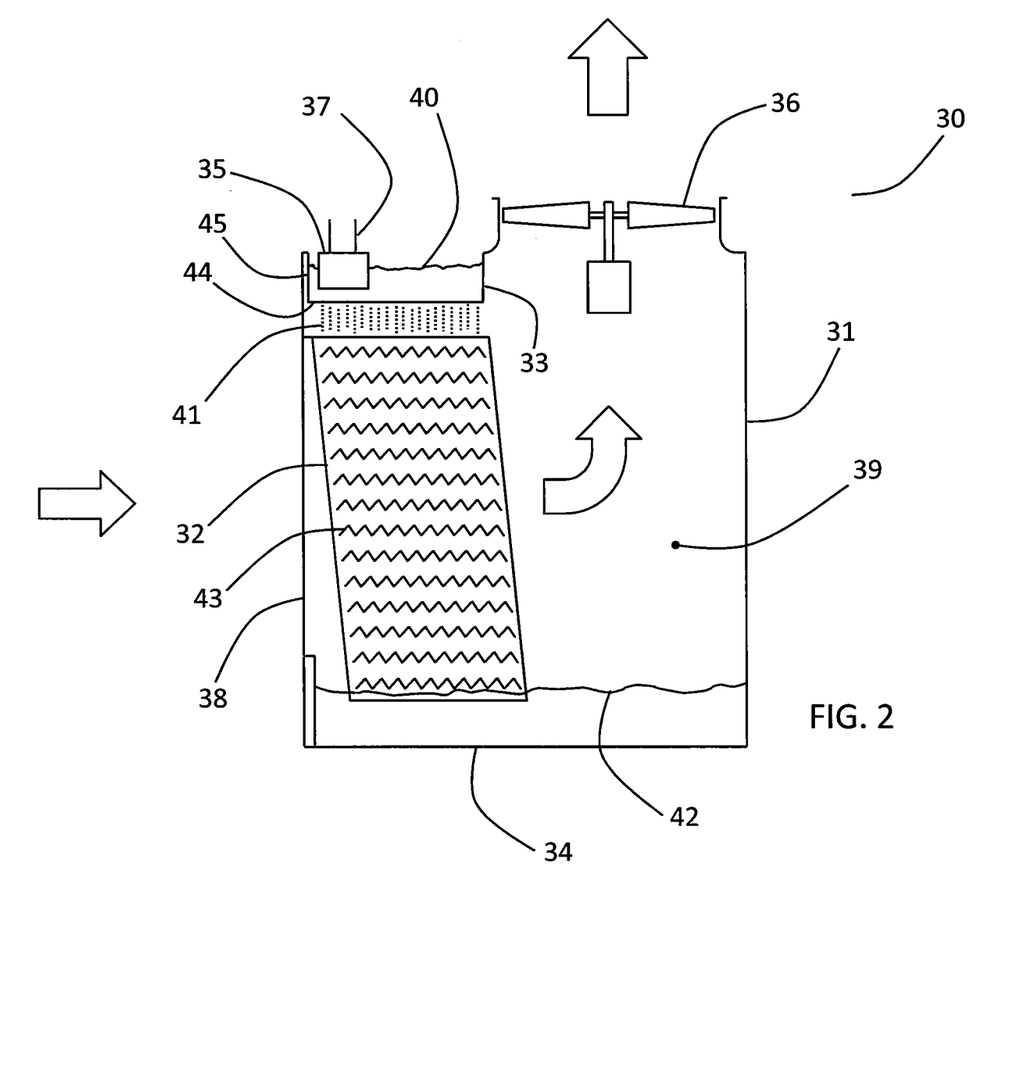
FIG. 2 is a side view of a direct heat exchange apparatus in accordance with the present invention.

Referring now to FIG. 2 of the drawings, an embodiment of the present invention is shown in a side view generally as direct heat exchange apparatus 30. Heat exchange apparatus 30 is comprised of casing 31, direct heat exchange fill pack 32, upper gravity drain water collection basin 33, lower sump 34, pre-distribution box 35, fan assembly 36, pre-distribution box pipe 37, air inlet 38 and plenum air outlet 39.

During operation, water to be heated or cooled enters direct heat exchange apparatus 30 through pre-distribution pipe 37, spreads across upper gravity feed water collection basin 33 and accumulates a head of water 40 inside upper gravity drain water collection basin 33. Upper gravity drain water collection basin 33 is generally an open top rectangular box comprised of sides 45 and upper gravity drain basin bottom plate 44, which has plurality of spray holes that are generally spaced throughout. Accumulated water head 40 inside upper gravity feed water collection basin 33 travels downward through the plurality of spray holes in basin bottom plate 44 and forms a well distributed flow 41 and falls on the top of direct heat exchange fill pack 32.

Direct heat exchange fill pack 32 is made of plurality of thin plastic fill sheet 43 that are either hung using a hanger system or bundled together in a block form and stacked underneath upper gravity drain water basin 33 and above lower sump 34. Direct heat exchange fill pack 32 has a plurality of air gaps so that both spray water and air can easily flow through. When spray water flows through direct heat exchange fill pack 32 and reaches lower sump 34, water accumulates in sump 34 to form a shallow pool 42 before exiting heat exchange apparatus 30. Air enters cooling tower direct heat exchange apparatus 30 through air inlet 38, travels through the plurality of gaps within fill pack 32, makes generally an upward turn inside plenum outlet 39 and exits cooling tower direct heat exchange apparatus 30 through fan assembly 36. As air travels though fill pack 32, heat exchange takes place between air and spray water on fill sheets 43.

Figure 2A:
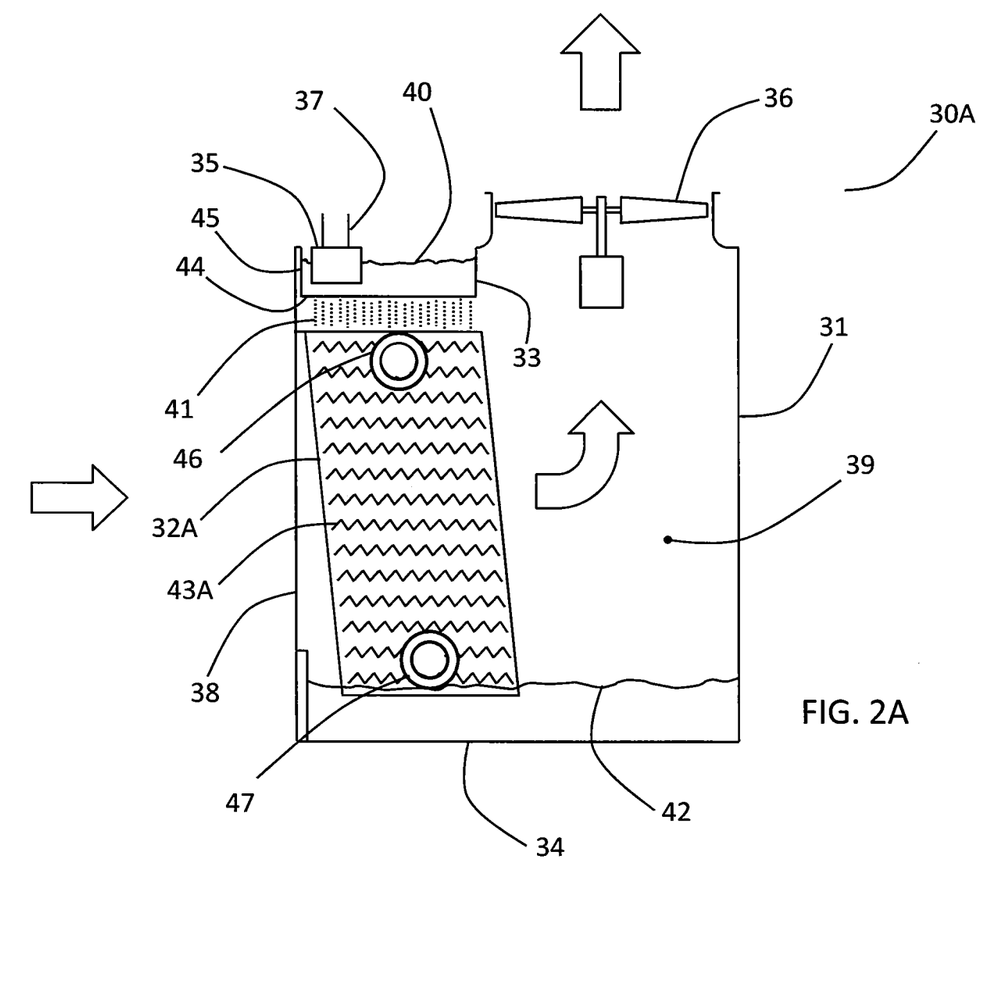
FIG. 2A is a side view of a indirect heat exchange apparatus in accordance with the present invention.

Referring now to FIG. 2A of the drawings, another embodiment of the present invention is shown in a side view generally as indirect heat exchange apparatus 30A. Indirect heat exchange apparatus 30A is comprised of casing 31, indirect heat exchange section 32A, indirect heat exchange inlet and outlet connections 46 and 47 respectively, upper gravity drain water collection basin 33, lower sump 34, pre-distribution box 35, fan assembly 36, pre-distribution box pipe 37, air inlet 38 and plenum air outlet 39.

During operation, process fluid to be heated, cooled, evaporated or condensed enters indirect heat exchange apparatus 30A through inlet connection 46 and exits from outlet connection 47. Evaporative fluid, usually water, enters pre-distribution pipe 37, spreads across upper gravity water collection basin 33 and accumulates a head of water 40 inside upper gravity drain water collection basin 33. Upper gravity drain water collection basin 33 is generally an open top rectangular box comprised of sides 45 and upper gravity drain basin bottom plate 44, which has plurality of spray holes that are generally spaced throughout. Accumulated water head 40 inside upper gravity water collection basin 33 travels downward through the plurality of spray holes in basin bottom plate 44 and forms a well distributed flow 41 and falls on the top of indirect heat exchange section 32A.

Indirect heat exchange section 32A may be made of plurality of plates 43A, tubes, or finned type heat exchangers and is not a limitation of the invention. Indirect heat exchanger plates 43A may be either hung using a hanger system or bundled together in a block form and stacked underneath upper gravity drain water basin 33 and above lower sump 34. Indirect heat exchange section 32A has a plurality of air gaps so that both spray water 41 and air can easily flow through. When spray water flows through indirect heat exchange section 32A and reaches lower sump 34, water accumulates in sump 34 to form a shallow pool 42 before exiting indirect heat exchange apparatus 30A.

Air enters indirect heat exchange apparatus 30A through air inlet 38, travels through the plurality of gaps within indirect heat exchange sections 43A, makes generally an upward turn inside plenum outlet 39 and exits indirect heat exchange apparatus 30A through fan assembly 36. As air travels through indirect heat exchanger 32A, indirect heat exchange takes place between the spray water and the interior process fluid while direct heat transfer takes place between the spray evaporative spray water and the air flowing.

Figure 3:
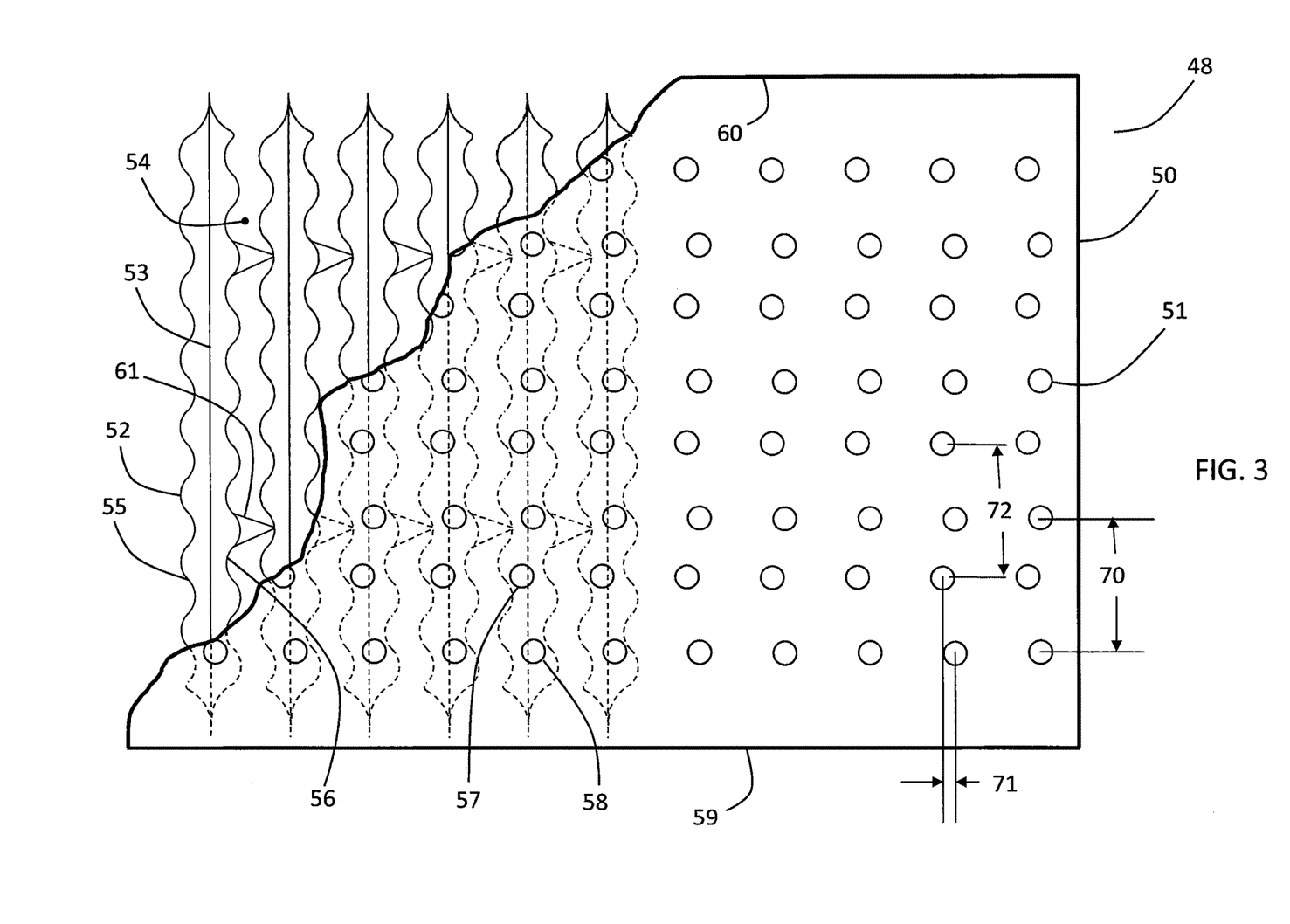
FIG. 3 is a top view of a part of upper gravity drain water collection basin in accordance with the present invention.

Referring now to FIG. 3 of the drawings, an embodiment of the present invention 48 is shown in a plan view. Upper gravity drain water collection basin bottom plate 50 has a plurality of spray water holes 51 that are strategically aligned over top of a plurality of direct heat exchange fill sheets 52. Each fill sheet 52 has a front face side 55 and a rear face side 56. Each fill sheet 52 is separated by a nominal distance determined by fill spacer 61 so that there is a gap between fill sheets 52. Fill sheet 52 has plurality of surface pattern humps and valleys that may weave in and out of fill sheet nominal plane 53 and that may not be vertically aligned when viewed downward from gravity drain water basin bottom plate 50. The geometry and positioning of these humps and valleys gives fill sheet 52 a body thickness when viewed downward from gravity drain water basin bottom plate 50. Each fill sheet 52 is typically made of thin sheets of plastic or PVC but can be made of any material desired.

Spray holes 51 are strategically aligned above the plurality of fill sheets 52 so that when spray water drops down through plurality of holes 51, the water falls onto fill sheets 52. The spray water streams purposely land on both face side 55 and obverse face side 56 of fill sheet 52. Spray holes 51 are separated by gap 70 and 72 in the width and separated by gap 71 between the face and obverse face sides. Generally gap 72 and 70 are equal such that the number of holes are reduced. Gaps 70 and 72 are at a distance apart such that when spray water hits fill sheet 52, the spray water spreads out such that fill sheet 52 is uniformly and evenly wetted. The combination of patterns, humps and valleys in fill sheets 52 spreads the single stream of water over a surface area as a thin film of water so that more efficient air to water heat exchange could take place. Air travels in the direction from air inlet edge 59 toward air outlet edge 60, and fill sheet 52 is aligned so that it doesn't block the air travel.

Spacing 70 and 72 must be optimized to allow for uniform spreading on the face 55 and obverse face sides of fill sheet 52 while simultaneously reducing the number of holes required such that the diameter of the holes are maximized. The hole 51 diameter and the hole spacing 70 and 72 can be found by iteratively solving the following equation:

Flow rate=number of fill sheets·hole spacing·hole coefficient, where hole spacing=fill sheet air travel length÷number of holes per fill sheet hole coefficient=$Cd·A·(2gh)^2$, where Cd is drag coefficient of hole in a plate,
A is area of hole
g is gravity constant, and
h is water column height in the gravity drain water basin.

The preferred hole 51 diameter is 0.4 inches±0.2 inches while the preferred gap 70 and 72 is 4 inches±2 inches. The balance between the selected hole diameter and selected spacing 70 and 72 vary depending on the required overall flow rate. Once the overall target design flow rate is known, holes gaps 70 and 72 and hole 51 diameter are iterated to arrive at a solution which guarantees even and uniform water coverage while minimizing the number of spray holes so that the spray performance can be maximized. This balance of finding optimum gaps 70 and 72 with hole 51 diameter guarantees maximum thermal heat transfer while reducing the possibility for hole clogging. Hole gap 71 is selectively set to insure both the face 55 and obverse face side of fill sheet 52 are properly covered. This gap is dependent on the gap between the fill sheets.

A set of face spray hole 57 and obverse face spray hole 58 that belongs to a same fill sheet 52 may not necessarily be in a straight line in the air travel direction. Face spray holes 57 are slightly biased toward face 55 direction from fill sheet nominal plane 53 and obverse face spray holes 58 are slightly biased toward obverse face 56 from fill sheet nominal plane 53 of corresponding fill sheet 52. The biasing of the holes exists so that when there is slight variation of location of fill sheet 52 in a parallel direction of air inlet edge 59, both face 55 and obverse face 56 are properly wetted by spray holes 51.

What is claimed is:

1. A cooling tower comprising:
   a heat exchange section including a plurality of fill sheets arranged in lateral rows, each fill sheet having a centerline, a front side, and a rear side, the front and rear sides being on opposite sides of the centerline;
   a water collection basin located above the heat exchange section,
   the water collection basin having a plurality of water collection basin openings arranged in lateral rows, each lateral row of water collection basin openings being directly above a corresponding one of the fill sheets to allow water to be distributed downwardly onto the corresponding fill sheet, the water collection basin openings each having a diameter of from 0.2 inch to 0.6 inch, the spacing between adjacent water collection basin openings is from 2.0 to 6.0 inches, wherein each lateral row of water collection basin openings includes a first plurality of openings overlapping the centerline of the corresponding fill sheet and longitudinally biased toward the front side of the corresponding fill sheet;

wherein each lateral row of water collection basin openings includes a second plurality of openings overlapping the centerline of the corresponding fill sheet and longitudinally biased toward the rear side of the corresponding fill sheet; and wherein each lateral row includes an alternating arrangement of the first plurality of openings and the second plurality of openings to evenly distribute the water across the front side and the rear side of the corresponding fill sheet.

2. The cooling tower of claim 1 wherein adjacent water collection basin openings in each lateral row are longitudinally offset from each other.

3. The cooling tower of claim 1 further comprising:

an inlet pipe; and a pre distribution box in the water collection basin configured to receive water from the inlet pipe and having openings that permit water to flow into the water collection basin.

4. A cooling tower comprising:

a direct heat exchange section including a plurality of fill sheets, each fill sheet having a centerline, a front side, and a rear side, the front and rear side being on opposite sides of the centerline;

the water collection basin having a plurality of water collection basin openings arranged in lateral rows, each lateral row of water collection basin openings being directly above a corresponding one of the fill sheets to allow water to be distributed downwardly onto the corresponding fill sheet, the water collection basin openings each having a diameter of from 0.2 inch to 0.6 inch, and the spacing between adjacent water collection basin openings is from 2.0 to 6.0 inches, wherein each lateral row of water collection basin openings includes a first plurality of openings overlapping the centerline of the corresponding fill sheet and longitudinally biased toward the front side of the corresponding fill sheet;

wherein each lateral row of water collection basin openings includes a second plurality of openings overlapping the centerline of the corresponding fill sheet and longitudinally biased toward the rear side of the corresponding fill sheet; and wherein each lateral row includes an alternating arrangement of the first plurality of openings and the second plurality of openings.

5. The cooling tower of claim 4 wherein adjacent water collection basin openings in each lateral row are longitudinally offset from each other.

6. The cooling tower of claim 4 further comprising:

an inlet pipe; and a pre-distribution box in the water collection basin configured to receive water from the inlet pipe and having openings that permit water to flow into the water collection basin.

* * * * *